(12) United States Patent
Purdy et al.

(10) Patent No.: US 8,510,382 B2
(45) Date of Patent: Aug. 13, 2013

(54) APPARATUS SYSTEM AND METHOD FOR RESPONDING TO WEB FORM INQUIRIES

(75) Inventors: Thomas Jeffrey Purdy, Springville, UT (US); David Randal Elkington, Springville, UT (US); Jeremiah Johnson, Springville, UT (US); Kenneth David Krogue, Alpine, UT (US); James Oldroyd, Watertown, MA (US)

(73) Assignee: InsideSales.com, Provo, UT (US)

( * ) Notice: Subject to any disclaimer, the term of this patent is extended or adjusted under 35 U.S.C. 154(b) by 390 days.

(21) Appl. No.: 11/872,691

(22) Filed: Oct. 15, 2007

(65) Prior Publication Data

US 2009/0100139 A1    Apr. 16, 2009

(51) Int. Cl.
*G06F 15/16* (2006.01)
*G06Q 10/00* (2012.01)

(52) U.S. Cl.
USPC .......................................... 709/205; 705/7.26

(58) Field of Classification Search
USPC ................................................. 709/203, 205
See application file for complete search history.

(56) References Cited

U.S. PATENT DOCUMENTS

| | | | |
|---|---|---|---|
| 6,961,756 B1 | 11/2005 | Dilsaver et al. | |
| 7,865,452 B2 | 1/2011 | Boies et al. | |
| 8,195,504 B2 | 6/2012 | Merrifield, Jr. et al. | |
| 2002/0082892 A1* | 6/2002 | Raffel et al. ...................... | 705/8 |
| 2004/0102994 A1 | 5/2004 | Boppana | |
| 2004/0102995 A1 | 5/2004 | Boppana | |
| 2004/0102996 A1 | 5/2004 | Boppana | |
| 2004/0128184 A1* | 7/2004 | Bracken et al. ................. | 705/10 |
| 2004/0133447 A1 | 7/2004 | Boppana | |
| 2008/0033778 A1* | 2/2008 | Boss et al. ........................ | 705/9 |

* cited by examiner

*Primary Examiner* — Afshawn Towfighi
(74) *Attorney, Agent, or Firm* — Echelon IP LLC; Everett D. Robinson (57) ABSTRACT

An apparatus, system, and method are disclosed for generating contact plans and responding to web form inquires using the contact plans.

22 Claims, 8 Drawing Sheets

White Paper

Please fill out the following information and the white paper on sales will be emailed to you immediately.

This white paper gives insights into marketing strategies and prepares you to fully implement a sound marketing strategy. Here's what you will learn:

10 Steps to Quadruple Sales Results:

- Find your Core Message
- Prioritize Features / Benefits
- Build an Assembly Line
- Motivate to Work Harder
- Get and Keep Permission
- Learn About Your Target Prospect
- Get Help from Gatekeepers
- Leave Compelling Voice Messages
- Sending Marketing Collateral
- Impression Marketing

*Required Fields

| Field | Value |
|---|---|
| First Name:* | John |
| Last Name:* | Doe |
| Company:* | Doe Enterprises |
| Email:* | John@doe.net |
| Phone:* | 999-555-1212 |
| How big is your sales team?:* | [SELECT] |

Submit

☑ Receive occasional product updates and offers.

Figure 6

EDIT CONTACT PLAN

Call Plan Name: [____________]

Add New Trigger:  Field: [State ▾]  Value: [Utah________]

[Add Trigger]

|  | 730 ↓ Field/Value | 710 ↓ ACD | 720 ↓ IVR | Delay Time (mins) |  |
|---|---|---|---|---|---|
|  | Lead Source | | | | |
| move up | Web | My Test ACD ▾ | My TestIVR ▾ | 1 | remove |
| move down | Phone | None ▾ | My TestIVR ▾ | 0 | remove |
|  | Lead Status | | | | |
| move up | Now | My Test ACD ▾ | None ▾ | 5 | remove |
| move down | Closed | My Test ACD ▾ | My TestIVR ▾ | 0 | remove |
|  | Apptment Set | My Test ACD ▾ | My TestIVR ▾ | 0 | remove |
|  | Default | | | | |
|  |  | My Test ACD ▾ | My TestIVR ▾ | 10 | |

[Save]

APPARATUS SYSTEM AND METHOD FOR RESPONDING TO WEB FORM INQUIRIES

BACKGROUND OF THE INVENTION

1. Field of the Invention

This invention relates to web form inquires and more particularly relates to means and methods for responding to web form inquires.

2. Description of the Related Art

Enterprises often have web pages where users can request additional information via a web form. However, many enterprises are ill equipped to respond to such inquires in a manner that maximizes the potential of such requests.

SUMMARY OF THE INVENTION

The present invention has been developed in response to the present state of the art, and in particular, in response to the problems and needs in the art that have not yet been fully solved by currently available web form response systems and methods. Accordingly, the present invention has been developed to provide an apparatus, system, and method for responding to web form inquiries that overcome shortcomings in the art.

In one aspect of the present invention, certain embodiments of one method for responding to web form inquiries include providing a web form to a user that prompts the user for contact data, receiving contact data associated with the user via the web form, retrieving additional data associated with the user, associating the user with a preferred contact plan, and contacting the user in accordance with the preferred contact plan. Examples of contact data include name, address, phone number, fax number, email address, instant messaging address, availability data, interest data, and the like.

The method may also include visually or sonically presenting information on the user to an agent. The information may be delivered via a variety of delivery services such as email services, instant messaging services, short message services, enhanced messaging services, text messaging services, telephony-based text-to-speech services, and multimedia delivery services.

The preferred contact plan may include a preferred contact method and a schedule for executing contact attempts. Examples of a contact method include initiating a phone call, sending an email, sending a facsimile, sending a text message, sending a paging message, leaving a voice mail, and communicating with the individual via an interactive voice response (IVR) system. In one embodiment, the contact plan includes a strategy for queuing a contact attempt. In certain embodiments, the preferred contact plan is a hybrid plan created from partitioning contact plans into parts and assembling the parts into hybrid contact plans.

In another aspect of the present invention, certain embodiments of a system for responding to web form inquiries include a web server configured to provide a web form to a user that prompts the user for contact data, and receive contact data associated with the user in response to the user submitting the web form. The system may also include a data server configured to retrieve additional data associated with the user and associate the user with a preferred contact plan and a contact server configured to contact the user in accordance with the preferred contact plan and deliver information on the user to an agent.

In another aspect of the present invention, certain embodiments of an apparatus to develop a contact plan for responding to web form inquiries, include a data collection module that receives a plurality of contact attempt records corresponding to inquiries for one or more web forms, a data analysis module that analyzes the contact attempt records to find correlations between contact outcome information and other information associated with the contact attempts such as time information, user information, and contact method information. The contact outcome information may include success or failure information related to a specific contact purpose.

The apparatus may also include a contact plan generation module that receives the correlations and formulates one or more contact plans, and a plan selection module configured to receive contact data for a user and select an appropriate contact plan from the generated contact plans.

In another aspect of the present invention, certain embodiments of a method to develop a contact plan include receiving a plurality of contact attempt records corresponding to inquiries for at least one web form, the contact attempt records comprising time information, user information, contact method information, and contact outcome information, and analyzing the contact attempt records to find correlations between the contact outcome information and the time information, user information, and contact method information.

The method may also include using the correlations to formulate a plurality of contact plans and analyzing additional contact attempt records and associated customer information to formulate a set of enhanced contact plans. The method may also include receiving contact data from a user and using the contact data to determine an appropriate contact plan from a set of available contact plans.

The methods described herein may be embodied as a computer program product or computer readable medium bearing computer usable program codes executable to perform operations to accomplish the described methods. It should also be noted that references throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium or computer-readable medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
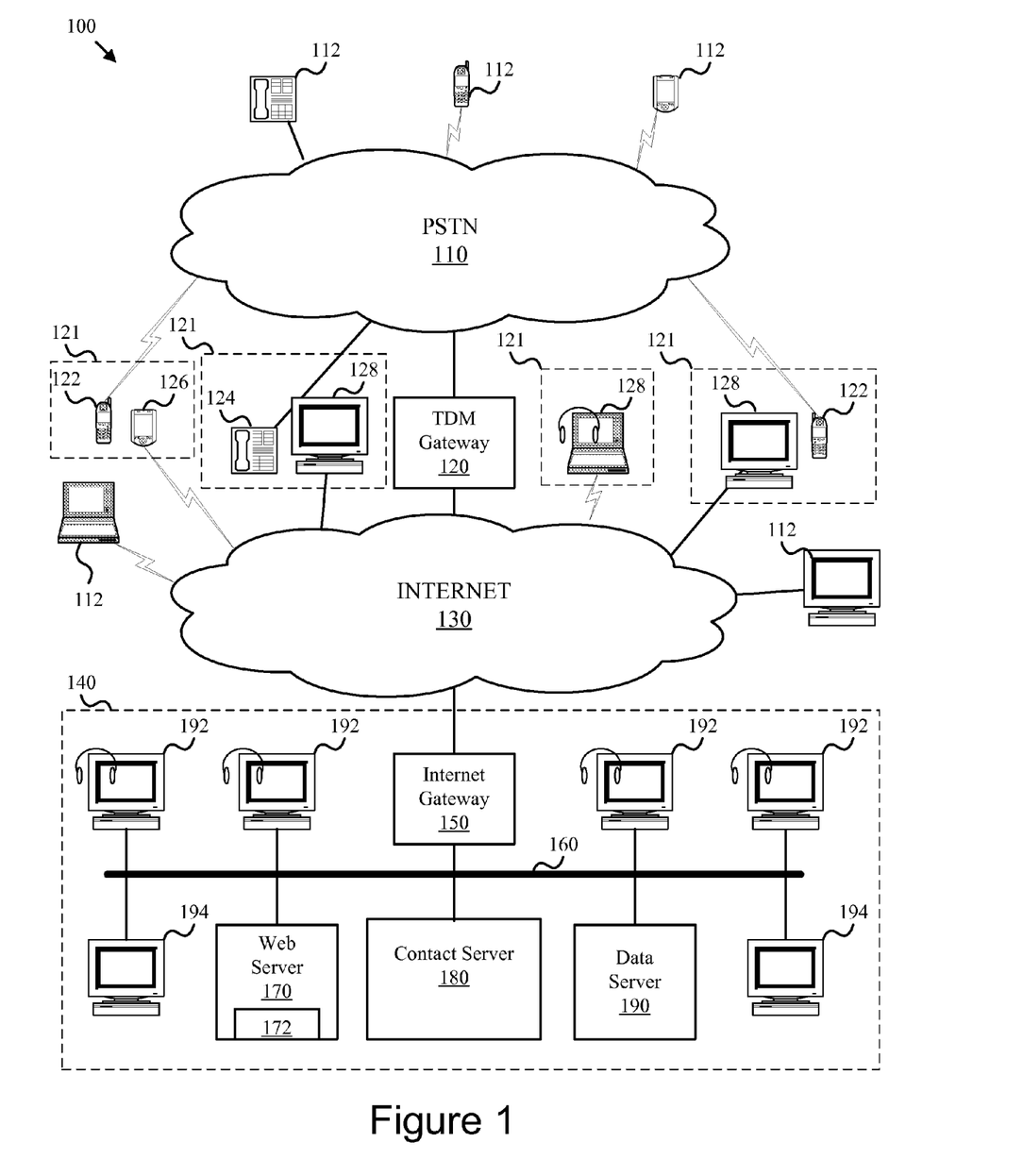
FIG. 1 is a schematic block diagram illustrating one embodiment of a web form response system in accordance with the present invention.

FIG. 1 is a schematic block diagram illustrating one particular embodiment of a web form response system 100 in accordance with the present invention. As depicted, the web form response system 100 includes various components such as a public switched telephone network (PSTN) 110, user communication and/or computing devices 112, a TDM gateway 120 connecting the PSTN to an internet 130, remote agent stations 121, workstations 128, a call center 140, an internet gateway 150 connecting a local area network 160 to the internet 130, and various servers such as a web server 170, a contact server 180, and a data server 190, local agent workstations 192, and control workstations 194. The particular embodiment 100 is one example of components that can be operably interconnected to provide a web form response system wherein the components function collaboratively to improve contact success rates.

In the depicted embodiment, the remote agent stations 121 include wireless phones 122, wired phones 124, wireless computing devices 126, and workstations 128. In certain embodiments, the wireless phones 122 or the wired phones 124 may be VOIP phones. In some embodiments, the computing devices 126 or the workstation 128 may be equipped with a soft phone. The remote agent stations 121 enable agents to provide services from remote locations similar to agents stationed at the workstations 192 and directly connected to the local area network 160.

In one embodiment, the local area network 160 resides within a call center 140 that uses VoIP and other messaging services to contact users connected to the PSTN 110 and/or the internet 130. The various servers in the call center 140 function cooperatively to receive web form submissions from users, contact users, provide customer data to agents via agent terminals such as the local agent workstations 192 and the remote agent stations 121, and connect the agents to the users. The users may be connected to the PSTN 110, the internet 130, or the like.

The web server 170 may provide one or more web forms 172 to users via browser displayable web pages. The web forms may be displayed to the users via a variety of communication and/or computing devices 112 including phones, laptop computers, desktop computers, media players, and the like that are equipped with a browser. In the depicted embodiment, the web forms 172 prompt the user for contact data such as name, address, phone number, fax number, email address, instant messaging address, referral information, availability information, and interest information. The web server 170 may receive the contact data associated with the user in response to the user submitting the web form and provide the contact data to the data server 190 or the like.

The data server 190 or the like may receive the contact data and retrieve additional data associated with the user such as web analytics data, reverse lookup data, credit check data, web site data, web site rank information, do-not-call registry data, data from a CRM database, and background check information. The data server may store the collected data in a datastore and associate the user with a preferred contact plan (not shown).

The contact server 180 or the like may contact the user in accordance with the preferred contact plan and deliver information on the user to an agent to enable the agent to achieve a particular purpose such as such as establishing a relationship with the user, thanking the user for their interest in a product, answering questions from the user, informing the user of a product or service offering, selling a product or service, surveying the user on their needs and preferences, and providing support to the user. The contact server 180 may deliver the information to the agent using a variety of delivery services such as email services, instant messaging services, short message services, enhanced messaging services, text messaging services, telephony-based text-to-speech services, and multimedia delivery services. The agent terminals 121 or 192 may visually or sonically present the information on the user and enable the agent to communicate with the user.

Figure 2:
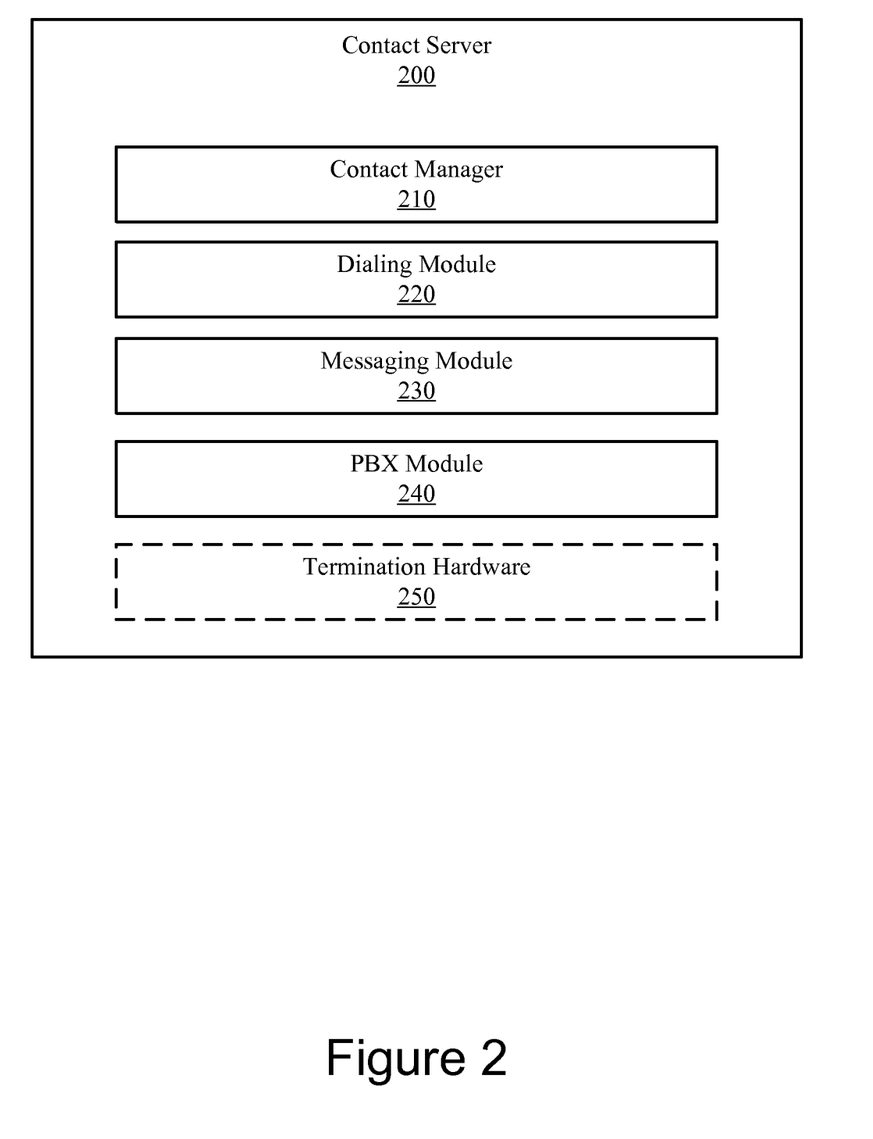
FIG. 2 is a schematic block diagram illustrating one embodiment of a contact server in accordance with the present invention.

FIG. 2 is a schematic block diagram illustrating one embodiment of a contact server 200 in accordance with the present invention. As depicted, the contact server 200 includes a contact manager 210, a dialing module 220, a messaging module 230, a PBX module 240 and termination hardware 250. The contact server 200 enables an agent to contact a user in conjunction with a contact plan. The contact server 200 is one example of the contact server 180 depicted in FIG. 1.

The contact manager 210 establishes contact with users and agents and manages contact sessions where needed. The contact manager 210 may initiate contact via the dialing module 220 and/or the messaging module 230.

The dialing module 220 establishes telephone calls including VOIP telephone calls and PSTN calls. In one embodiment, the dialing module 220 receives a unique call identifier, establishes a telephone call, and notifies the contact manager that the call has been established. Various embodiments of the dialing module 220 incorporate auxiliary functions such as retrieving telephone numbers from a database, comparing telephone numbers against a restricted calling list, transferring a call, conferencing a call, monitoring a call, playing recorded messages, detecting answering machines, recording voice messages, and providing interactive voice response (IVR) capabilities. In some instances, the dialing module 220 directs the PBX module 240 to perform the auxiliary functions.

The messaging module 230 sends and receives messages to agents and users. The messaging module may leverage one or more delivery or messaging services such as email services, instant messaging services, short message services, and enhanced messaging services. The PBX module 240 connects a private phone network to the public switched telephone network (PSTN) or the like. The contact manager 210 or dialing module 220 may direct the PBX module 240 to connect a line on the private phone network with a number on the PSTN or internet. In some embodiments, the PBX module 240 provides some of the auxiliary functions invoked by the dialing module 220.

The termination hardware 250 routes calls from a local network to the public switched telephone network (PSTN). In one embodiment, the termination hardware 250 interfaces to conventional phone terminals. In some embodiments and instances, the termination hardware 250 provides some of the auxiliary functions invoked by the dialing module 220.

Figure 3:
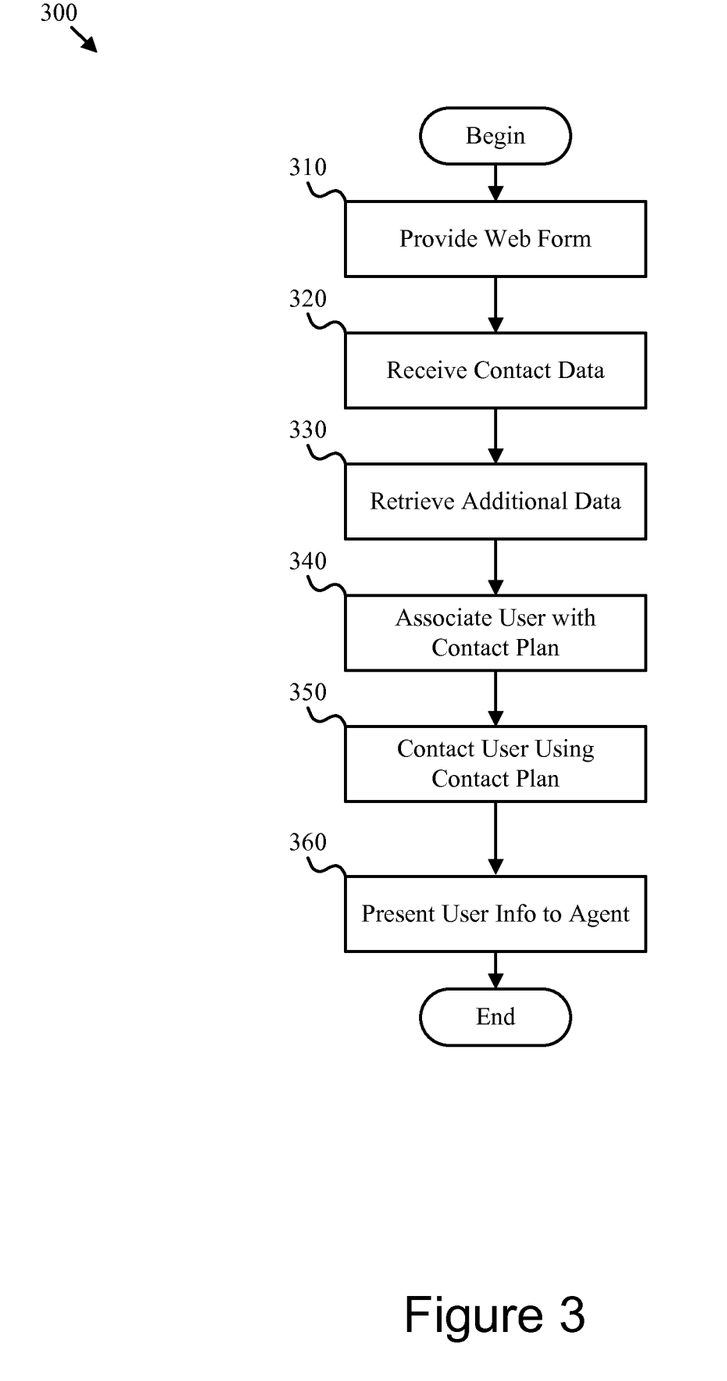
FIG. 3 is a schematic flow chart diagram illustrating one embodiment of a web form response method in accordance with the present invention.

FIG. 3 is a schematic flow chart diagram illustrating one embodiment of a web form response method 300 in accordance with the present invention. As depicted, the web response method 300 includes providing 310 a web form, receiving 320 contact data, retrieving 320 additional data, associating 340 a user with a preferred contact plan, contacting 350 the user, and presenting 360 information regarding the user to an agent. The web response method 300 improves contact rates and contact outcomes between an agent and a user.

Figure 6:
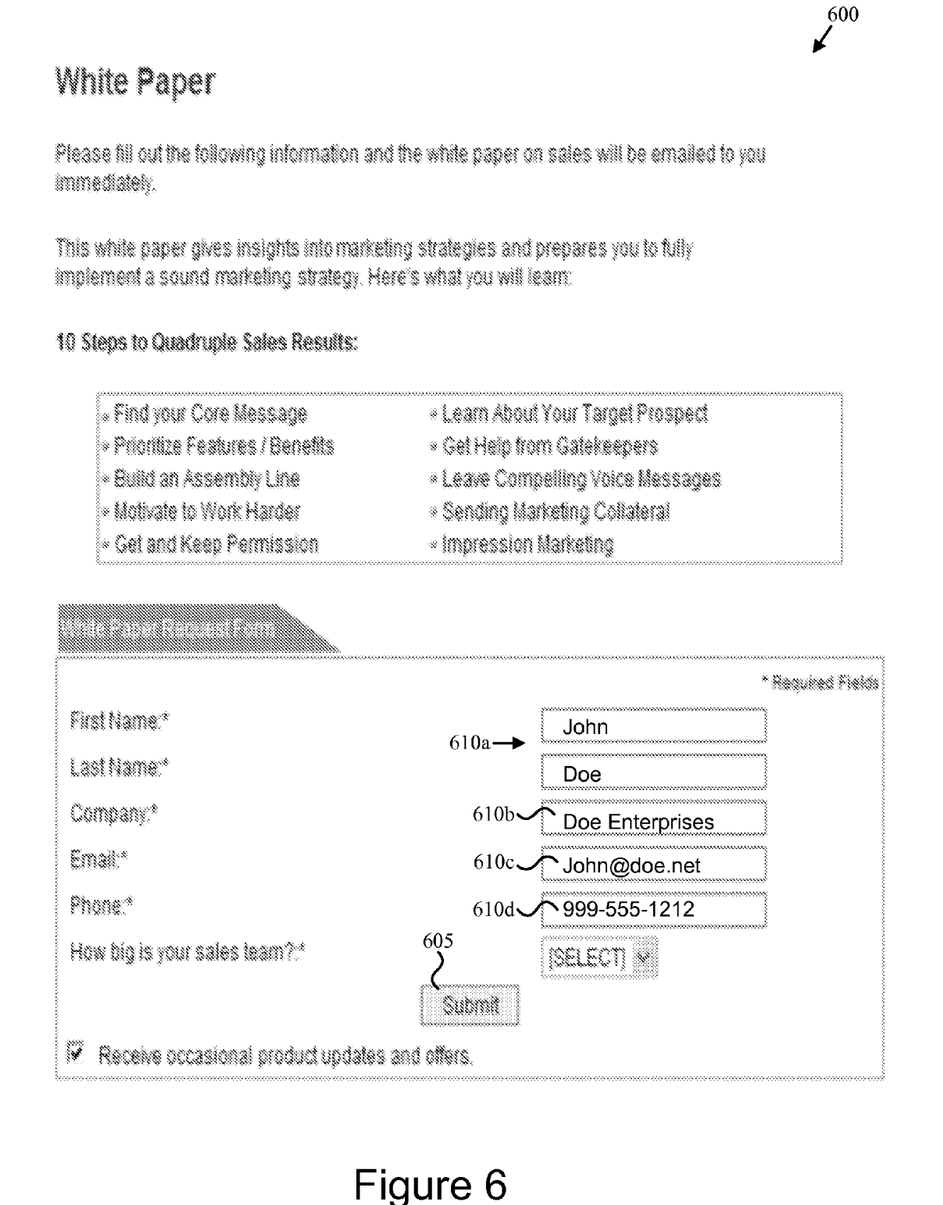
FIG. 6 is a computer interface diagram illustrating one particular example of one embodiment of a web form in accordance with the present invention.

Providing 310 a web form may include providing a browser displayable form that enables a user to submit contact information. One example of such a web form is shown in FIG. 6. Receiving 320 contact data may include receiving a web form submission for the user and providing contact data included within the submission to a data server such as the data server 190. Retrieving 330 additional data may include retrieving data from a variety of sources that could enable improved selection of a contact plan and/or improved success rates for achieving a particular purpose when contacting a user. Examples of additional data include web analytics data, reverse lookup data, credit check data, web site data, web site rank information, do-not-call registry data, data from a CRM database, and background check information.

Associating 340 a user with a preferred contact plan may include correlating the contact data and additional data with statistical data associated with a variety of contact plans and selecting the contact plan with the highest correlation as the preferred contact plan. The preferred contact plan may include a preferred contact time and contact method as well as a backup contact time and method. The preferred contact time may be 'immediately'. In certain embodiments, the contact plan includes a preferred schedule for contact attempts.

The preferred contact plan may also include a queuing strategy for handling a contact attempt with the user. For example, the queuing strategy may select an agent based on the demographic data of the user and the location of the user. Implementing a queuing strategy may improve success rates for contact experiences.

Contacting 350 the user may include contacting at a time and method specified by the preferred contact plan. The contact time may be a relative time such as 13 minutes after submission of a web form or an absolute time such as 8 pm on a Tuesday, or a range such as more than 10 minutes and less than 20 minutes after submission of a web form. The preferred contact time may be dependent on the particular web form. For one particular web form, a contact time within 5 minutes of the web form submission was found to yield superior results. For another web form, a contact time that was approximately 24 hours after the web form submission was found to yield superior results.

Examples of a contact method include initiating a phone call, sending an email, sending a facsimile, sending a text message, sending a paging message, leaving a voice mail, and communicating with the individual via an interactive voice response (IVR) system. In one embodiment, an IVR delivers a thank you message from a representative of the company (for example a CEO) and provides an opportunity to review product information, speak to an agent, request literature, and the like.

In one embodiment, a contact plan is deferred until a message or document or URL that is sent to the user is opened by the user. For example, an email message may have codes embedded therein that are executed when the user opens the email. The codes may generate a signal to the contact server or the like that initiates a contact plan.

Figure 7:
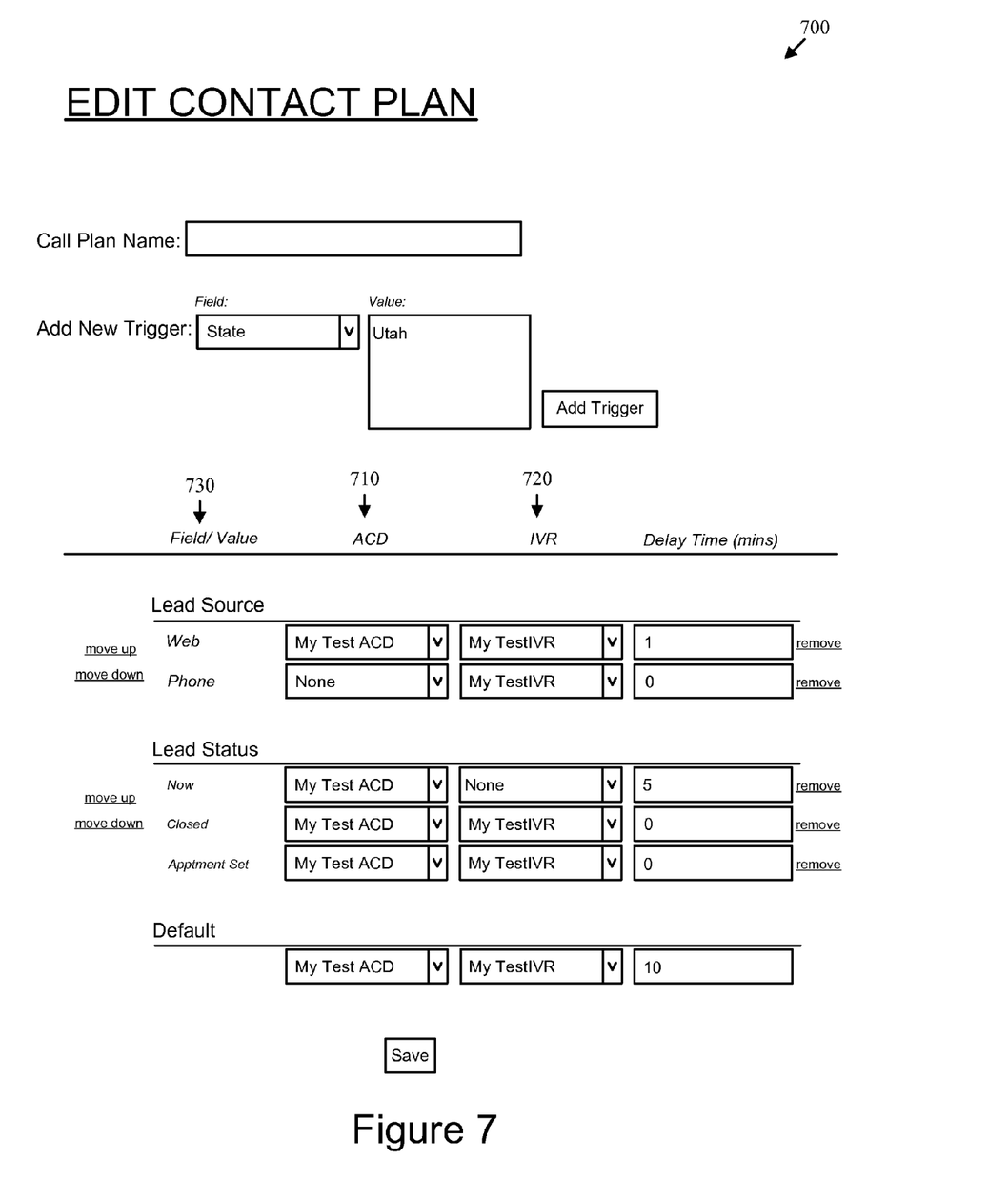
FIG. 7 is a computer interface diagram illustrating one particular example of one embodiment of an interface for specifying particular elements of a contact plan in accordance with the present invention.

Presenting 360 information regarding the user to an agent, may include visually or sonically presenting the contact data and additional data to an agent via an agent terminal. FIG. 7 depicts one example of presenting such information. In one embodiment, the information is presented to the agent via a screen pop or popup dialog. The information presented to the agent may be delivered using a variety of delivery services such as email services, instant messaging services, short message services, enhanced messaging services, text messaging services, telephony-based text-to-speech services, and multimedia delivery services.

Figure 4:
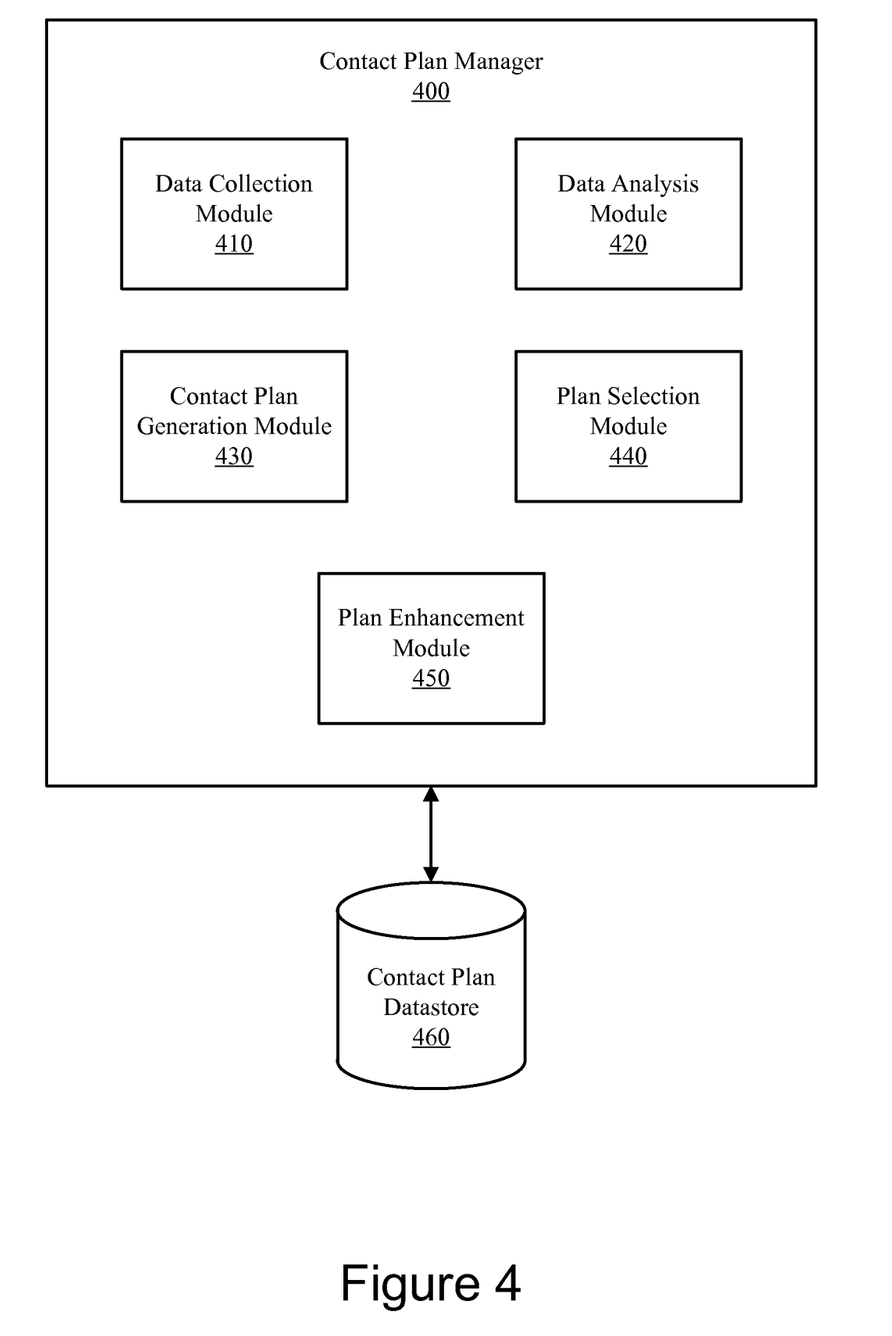
FIG. 4 is a schematic block diagram illustrating one embodiment of a contact plan manager in accordance with the present invention.

FIG. 4 is a schematic block diagram illustrating one embodiment of a contact plan manager 400 in accordance with the present invention. As depicted, the contact plan manager includes a data collection module 410, a data analysis module 420, a contact plan generation module 430, a plan selection module 440, and a plan enhancement module 440. The contact plan manager facilitates generation and selection of a preferred contact plan for responding to web form inquiries from users.

The data collection module 410 may aggregate contact attempt records or other data corresponding to inquiries for at least one web form. The contact attempt records or other data may include information that specifies the time, manner, and outcome of the contact attempts as well as user information. The data analysis module 420 may analyze the contact attempt records to find correlations between the contact outcome information and other information such as the time information, user information, and contact method information.

The contact plan generation module 430 may receive the correlations and formulate a variety of contact plans that reflect the statistical correlations between outcomes and the other information contained in the contact attempt records. In one embodiment, users with correlated data may be assigned to a group and a contact plan is generated for that group along with mean and variance information for specific information fields that may be used to correlate and compare other users with the group.

The plan selection module 440 may receive contact data for a particular user, correlate the data with statistical data associated with a number of available contact plans and select a preferred contact plan from the available contact plans. One of skill in the art will appreciate that a variety of algorithmic, statistical, or computational methods may be applied in determining which contact plan is preferred for a specific user. A contact plan datastore 460 may store the contact plans and data associated with the contact plans such as statistical data.

The plan enhancement module 450 may receive and analyze additional contact attempt records including associated customer data and determine if adjustments to the contact plans may result in enhanced performance for the response system 100 or the like. In certain embodiments, the plan enhancement module 450 may randomize a contact plan to increase contact success, and/or partition the contact plans into parts and combine the parts to create hybrid contact plans. For example, the contact plans may be partitioned into contact methods and contact purpose, each of which may be correlated to specific attributes from contact attempts records to create multiple subplans for various contact methods and contact purposes. The subplans for various contact methods and contact purposes may then be combined into a number of hybrid plans that each meet the needs of specific populations. One of skill in the art will appreciate that other forms of optimization not disclosed herein that are familiar to those of skill in the art may be conducted by the plan enhancement module 450.

Figure 5:
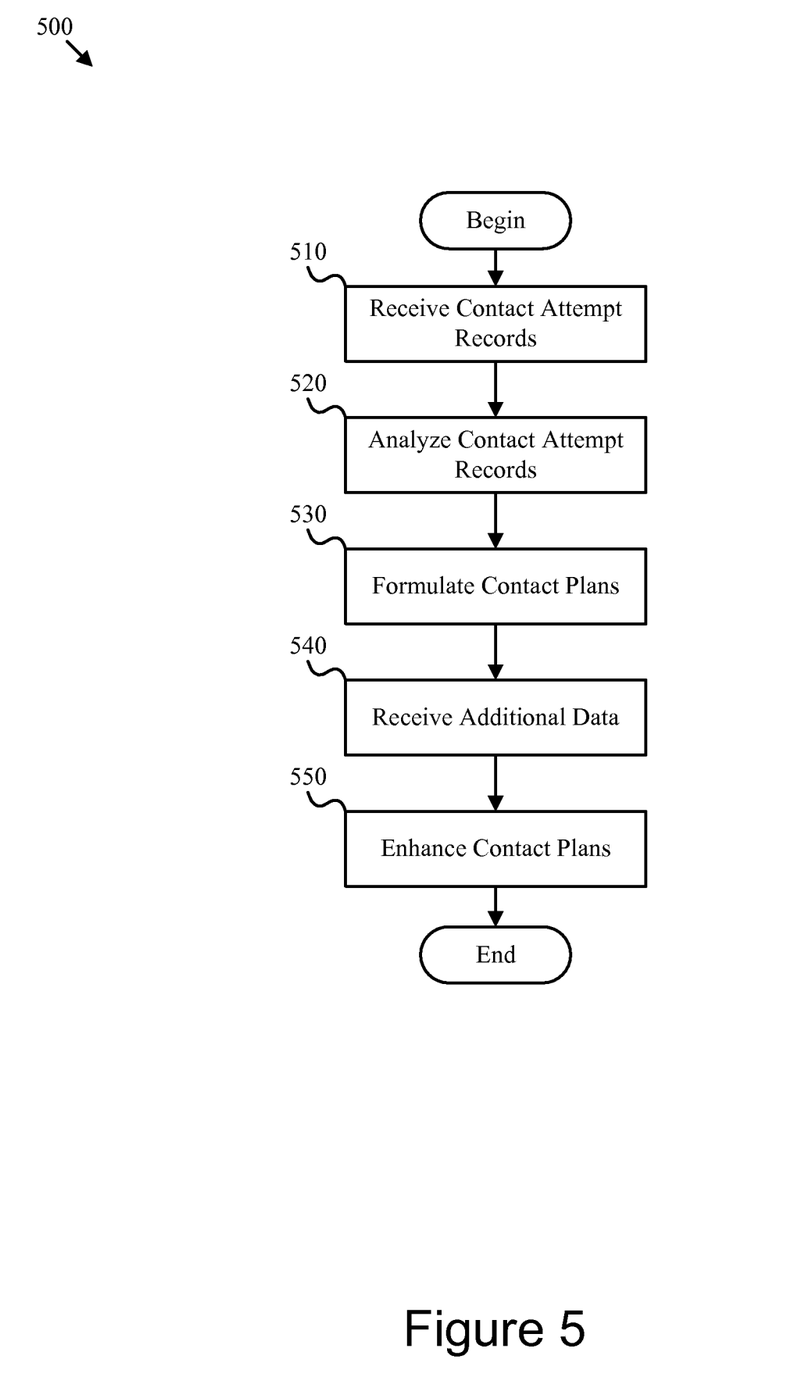
FIG. 5 is a schematic flow chart diagram illustrating one embodiment of a contact plan generation method in accordance with the present invention.

FIG. 5 is a schematic flow chart diagram illustrating one embodiment of a contact plan generation method 500 in accordance with the present invention. As depicted, the contact plan generation method 500 includes receiving 510 contact attempt records, analyzing 520 the contact attempt records, formulating 530 one or more contact plans, receiving 540 additional data, and enhancing 550 the contact plans.

Receiving 510 contact attempt records may include receiving contact attempt records corresponding to inquiries for one or more web forms. In certain embodiments, the contact attempt records include time information, user information, contact method information, and contact outcome information.

Analyzing 520 the contact attempt records may include finding correlations between the contact outcome information and the time information, user information, and contact method information. Formulating 530 one or more contact plans may include using the correlations to formulate a set of contact plans intended to improve contact successes. The method 500 may also include 540 analyzing additional contact attempt records and enhancing 550 the contact plans. In certain embodiments, enhancing 550 includes randomizing contact plans and/or partitioning the contact plans to facilitate hybridization. In one embodiment, enhancing 550 includes detecting if a contact plan is yielding substantially inferior results to a default plan, scrapping the plan if the results are substantially inferior to the default plan, and building a new contact plan to replace the inferior contact plan. The default plan may be a contact plan that is used if little information is known about a user and/or submitters of a particular form. In one embodiment, the default plan comprises contacting a user within 5 minutes of receiving a submitted web form.

FIG. 6 is a computer interface diagram illustrating one particular example of one embodiment of a web form 600 in accordance with the present invention. The depicted web form 600 invites a user to obtain more information concerning a subject of interest. In order to obtain the information, the user must provide certain information within the controls of the form and activate a submit control 605. In the depicted example, the information provided by the user includes identity information 610a, company information 610b, email address information 610c, and phone number information 610d.

FIG. 7 is a computer interface diagram illustrating one particular example of one embodiment of an interface 700 for specifying particular elements of a contact plan in accordance with the present invention. In the depicted embodiment, a queuing strategy 710 and an IVR script 720 can be specified for particular scenarios 730 such as source of the contact request or status of the contact process. By using the interface 700 and other interfaces to specify a variety of contact plans, data can be collected on the success of those contact plans and the collected data can be used to enhance the contact plans and the process of matching contact plans to particular users can be improved.

Figure 8:
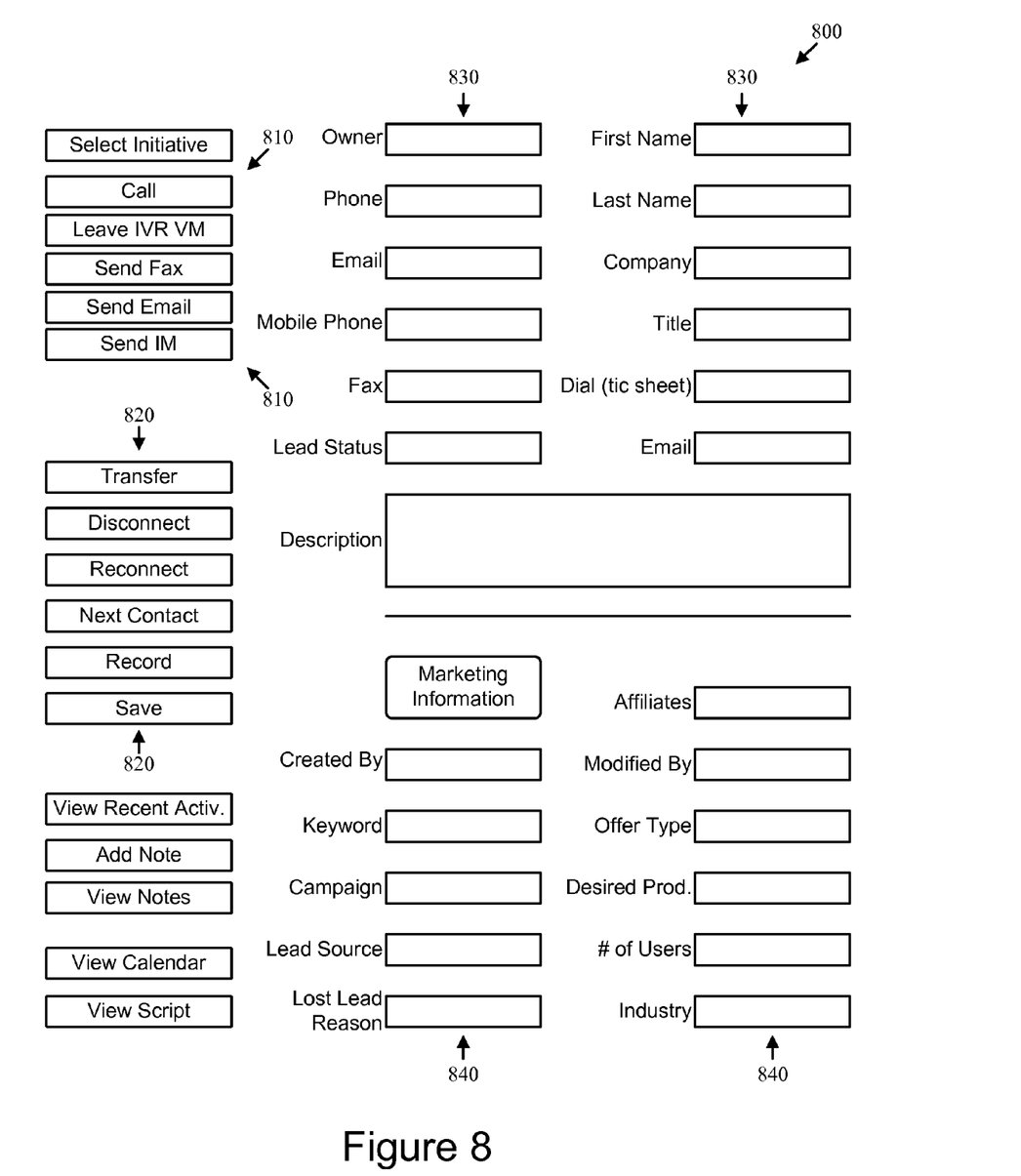
FIG. 8 is a computer interface diagram illustrating one embodiment of an exemplary agent interface in accordance with the present invention.

FIG. 8 is a computer interface diagram illustrating one particular example of one embodiment of an agent interface 800 in accordance with the present invention. In the depicted embodiment, the controls include controls 810 for contacting a user and controls 820 for controlling a conversation. The exemplary agent interface 800 also includes a large variety of information fields that provide information to the agent. The depicted embodiment, includes user information fields 830 and marketing information fields 840. The information fields and controls of the interface 800 enable an agent to contact and/or communicate with a user in order to achieve a particular purpose.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for responding to inquiries made by contacting persons through web forms, those responses made through the use of contact plans that specify modes of contact with contacting persons, those contact plans containing information not specific to a particular contacting person but rather that information being capable of association to more than one person making contact through a web form, said system comprising:
  a web server configured to receive contact data submitted by a contacting person via a web form on a browser displayable web page in response to the contacting person entering and submitting contact data within the web form;
  a data server configured to retrieve additional data associated with the contacting person, the additional data selected from the group consisting of: web analytics data, reverse lookup data, credit check data, web site data, web site rank information, do-not-call registry data, and background check information;
  said data server being further configured to access a set of contact plans containing contact plan information not specific to a particular contacting person, the contact plan information being capable of association to more than one person making contact through a web form, the contact plan information including: a preferred contact time, a preferred contact method, a backup contact time, and a backup contact method;
  said data server further configured to automatically select a preferred contact plan for the contacting person from the set of accessed contact plans, that selection of a contact plan based on data selected from the group consisting of: the contact data associated received from the contacting person via the web form, retrieved additional data associated with the contacting person, contact attempt records, and contact outcome information;
  the data server further configured to associate the contacting person with the selected preferred contact plan by which the contacting person may be identified by the contact plan information of the selected preferred contact plan; and
  a contact server configured to select a contacting person in accordance with a preferred contact plan to which the selected contacting person is associated and deliver information on the selected contacting person to an agent, said contacting server being further configured to perform that delivery of information of a selected contacting person upon the occurrence of an event specified in a contact time included in the contact plan information of the preferred contact plan associated to that contacting person for which information is being delivered.

2. The system of claim 1, wherein the contact server is further configured to deliver the information of a contacting person to the agent using a delivery service selected from the group consisting of email services, instant messaging services, short message services, enhanced messaging services, text messaging services, telephony-based text-to-speech services, and multimedia delivery services.

3. The system of claim 1, wherein said web server is further configured to provide a web form to a user via a browser displayable web page, the provided web form configured to prompt the user for contact data selected from the group consisting of a name, an address, at least one phone number, at least one fax number, at least one email address, an instant messaging address, address referral data, availability data, and interest data.

4. An apparatus to develop a contact plan for automatically responding to web form inquiries, the apparatus comprising:
  a data collection module configured to receive a plurality of contact attempt records each corresponding to the submission of contact data submitted by a contacting person through at least one web form, the contact attempt records comprising time information, personal information of a contacting person, contact method information, and contact outcome information;
  a data analysis module configured to analyze the received contact attempt records to find correlations between the contact outcome information and the time information, user information, and contact method information;
  a contact plan generation module configured to receive the found correlations and automatically formulate a plurality of contact plans, each of the formulated contact plans containing contact plan information not specific to a particular contacting person, the contact plan information being capable of association to more than one person making contact through a web form; the contact plan information of each of the plurality of contact plans including a contact time and a contact method; and
  wherein each of said data collection module, said data analysis module, and said contact plan generation module are implemented as executable code configured for execution on a computer, said executable code being stored on one or more non-transitory computer readable storage media.

5. The apparatus of claim 4, further comprising a plan selection module configured to receive contact data for a user and select an appropriate contact plan from the formulated plurality of contact plans generated by said contact plan generation module; wherein said plan selection module is implemented as executable code configured for execution on a computer, said plan selection module code being stored on one or more non-transitory computer readable storage media.

6. A method of interacting with a computer system including a server configured to provide contact information of inquiring persons, those inquiring persons being individually associated with contact plans selected from a set of contact plans stored on said computer system, each contact plan within the set containing contact plan information not specific to a particular person to be contacted, the contact plan information being capable of association to more than one inquiring person providing contact information through a form submitted over a network, the system including a store of user information particular to inquiring persons, the user information including contact information provided by inquiring persons, the user information being stored on the computer system for later retrieval and delivery to a contacting agent, the contact plan information of each contact plan within the set including an event upon which contact with an inquiring person is to be made and a specified mode of contact, the computer system detecting the occurrence of events within the set of contact plans, the computer system including terminals by which a contacting agent may interact with the computer system, said method being performed through the execution of non-transitory instructions by the computer system and comprising the steps of:

accessing said server through a terminal;

receiving, upon the occurrence of an event specified by one of said contact plans associated with an inquiring person, directions to make contact with that inquiring person, those directions including a mode of contact as specified by said contact plan associated with that inquiring person and user information as needed to make contact with that inquiring person using the specified mode of contact;

upon receiving directions to make contact with an inquiring person, making a contact attempt with that inquiring person using the mode specified by said contact plan associated with that inquiring person as addressed by the user information included with said received directions;

upon making a contact attempt with an inquiring person using a mode and user information included in received directions, returning to said system an indication of success or failure of the contact attempt; and     repeating said steps of receiving directions, making a contact attempt, and returning an indication of success or failure for successive inquiring persons, said repeating being performed as the event specified by said contact plans associated with each successive inquiring persons occurs.

7. The method of claim 6, wherein the receiving of directions to make contact with an inquiring person is made through a mode of communication selected from the group consisting of: email services, instant messaging services, short message services, enhanced messaging services, text messaging services, telephony-based text-to-speech services, and multimedia delivery services.

8. The method of claim 6, wherein the directions received in the course of performing the step of receiving of directions to make contact specify a mode of contact selected from the group consisting of: a physical address, a telephone number, an email address, and an instant messaging address; and wherein the user information included within those received directions contains an address for the inquiring person suitable for the specified mode of contact.

9. The method of claim 6, wherein identification of the contact plan that specified the event that occurred to cause the receiving of directions to make contact is received; and wherein with said returning an indication of success or failure of the contact attempt also returns the received contact plan identification.

10. The method of claim 6, wherein identification of an event that occurred to cause the receiving of directions to make contact is received contemporaneously with those received directions.

11. A method of operating a computer system including a server configured to provide contact information of inquiring persons, those inquiring persons being associated with a contact plan selected from a set of contact plans stored on said computer system, the system including a store of user information particular to inquiring persons, the user information including contact information provided by inquiring persons, the user information being stored on the computer system for later retrieval and delivery to a contacting agent, the contact plan information of each contact plan within the set including an event upon which contact with an inquiring person is to be made and a specified mode of contact, the computer system including terminals by which a contacting agent may interact with the computer system, said method being performed through the execution of non-transitory instructions by the computer system and comprising the steps of:

operating a server by which agents may access said computer system through terminals;

accessing said set of contact plans and user information specific to inquiring persons, each contact plan within the set containing contact plan information not specific to a particular person to be contacted, the contact plan information being capable of association to more than one inquiring person having providing contact information through a form submitted over a network;

detecting the occurrence of events specified by a contact plan within said set of contact plans associated with an inquiring person;

delivering to an agent directions to make contact with an inquiring person for which an event specified by a contact plan associated with that inquiring person has occurred, the delivery of directions being made to that agent through one of said terminals, those directions including a mode of contact as specified by said contact plan associated with that inquiring person and user information as needed to make contact with that inquiring person using the specified mode of contact;

following the delivery of directions to make contact with an inquiring person, receiving an indication of success or failure of the contact attempt;

upon receiving an indication of success or failure of a contact attempt, creating a contact attempt record identifying the contact plan used in the course of that contact attempt; and     repeating said steps of detecting the occurrence of events, delivering directions to an agent, receiving an indication of success or failure and creating a contact attempt record, said repeating being performed as events specified by said contact plans associated with each successive inquiring persons occurs.

12. The method of claim 11, wherein the delivering of directions to make contact with an inquiring person is made through a mode of communication selected from the group consisting of: email services, instant messaging services, short message services, enhanced messaging services, text messaging services, telephony-based text-to-speech services, and multimedia delivery services.

13. The method of claim 11, wherein the directions delivered in the course of performing the step of delivering of directions to make contact specify a mode of contact selected from the group consisting of: a physical address, a telephone number, an email address, and an instant messaging address; and wherein the user information included within those received directions contains an address for the inquiring person suitable for the specified mode of contact.

14. The method of claim 11, wherein said detecting the occurrence of events specified by a contact plan detects times specified within said set of contact plans.

15. The method of claim 14, wherein the user information includes the time of the initial submission of a form by an inquiring person, and further wherein the detecting the occurrence of events specified by a contact plan makes a comparison between a time interval specified within said set of contact plans and the relative time passed from the time of the initial submission of a form and the present time.

16. The method of claim 14, wherein the user information includes the time of the last contact attempt, and further wherein the detecting the occurrence of events specified by a contact plan makes a comparison between the time interval specified within said set of contact plans and the relative time passed the time of the last contact attempt and the present time.

17. The method of claim 14, wherein the contact plan associated with an inquiring person specifies an event that is an absolute time, and further wherein the user information includes an absolute time for which a contact attempt is to occur.

18. The method of claim 11, wherein each contact plan within the set of contact plans used within the step of said detecting the occurrence of events includes a preferred contact time, a preferred contact method, a backup contact time, and a backup contact method.

19. The method of claim 11, wherein said method further comprises the steps of:

receiving a plurality of contact attempt records made in the course of repeatedly executing the step of creating a contact attempt record; the contact attempt records containing information including the time of a contact attempt, identification of an inquiring person attempting to be contacted, the mode of contact used in making a contact attempt, and the outcome of a contact attempt;

analyzing the contact attempt records to find correlations between the contact outcomes and the other information contained within the received contact attempt records;

using the correlations, automatically formulating new contact plans each specifying a new contact time and mode of contact;

integrating newly formulated contact plans into said set of contact plans.

20. The method of claim 19, wherein said step of automatically formulating new contact plans generates a hybrid plan.

21. The method of claim 11, wherein said method further comprises the steps of:

receiving contact data submitted by an inquiring person through a form into said computer system and storing that submitted contact data within said store of user information;

optionally retrieving additional data associated with an inquiring person, the additional data being selected from the group consisting of: web analytics data, reverse lookup data, credit check data, web site data, web site rank information, do-not-call registry data, and background check information;

associating a contact plan selected from a set of contact plans stored on said computer system with an inquiring person, each contact plan within the set containing contact plan information not specific to a particular person to be contacted, the contact plan information being capable of association to more than one inquiring person having providing contact information through a form submitted over a network, the contact plan information of each contact plan within the set including an event upon which contact with an inquiring person is to be made and a specified mode of contact;

wherein the steps of receiving contact data submitted by an inquiring person, retrieving additional data associated with an inquiring person, and associating a contact plan with an inquiring person are performed prior to the step of detecting the occurrence of events specified by a contact plan.

22. The method of claim 11, wherein at least one of the contact plans within the set of contact plans accessed in the step of said accessing includes a queueing strategy, and wherein said step of delivering to an agent directions to make contact is performed to prioritize the delivery of modes of contact and the user information of inquiring persons in accordance with the queueing strategy specified by the contact plan also specifying an event that causes a plurality of modes of contact and user information of inquiring persons to be delivered.

* * * * *